United States Patent [19]
Tang et al.

[11] Patent Number: 5,332,426
[45] Date of Patent: Jul. 26, 1994

[54] AGGLOMERATED ACTIVATED CARBON AIR FILTER

[75] Inventors: Yuan-Ming Tang, New Brighton; John C. Kostecki, Cottage Grove; Eric G. Graeve, Eagan, all of Minn.

[73] Assignee: Minnesota Mining and Manufacturing Company, St. Paul, Minn.

[21] Appl. No.: 87,629

[22] Filed: Jul. 1, 1993

Related U.S. Application Data

[63] Continuation-in-part of Ser. No. 921,234, Jul. 29, 1992, abandoned.

[51] Int. Cl.$^5$ .............................................. B01D 53/04
[52] U.S. Cl. ........................................ 96/153; 55/385.3; 55/467; 55/514; 55/521; 55/523; 55/524; 55/DIG. 5
[58] Field of Search ..................... 96/108, 153, 154; 55/512, 514, 523, 524, DIG. 5, 385.3, 467, 473, 521

[56] References Cited

U.S. PATENT DOCUMENTS

| | | | |
|---|---|---|---|
| 2,765,046 | 10/1956 | Randholz | 183/4 |
| 3,217,715 | 11/1965 | Berger et al. | 131/10 |
| 3,375,933 | 4/1968 | Rodman | 210/502 |
| 3,474,600 | 10/1969 | Tobias | 55/524 |
| 3,538,020 | 11/1970 | Heskett et al. | 210/496 |
| 3,544,507 | 12/1970 | Lloy | 260/39 |
| 3,545,622 | 12/1970 | Sakhnovsky et al. | 96/153 X |
| 3,611,678 | 10/1971 | Holden | 55/387 |
| 3,645,072 | 2/1972 | Clapham | 55/387 |
| 3,687,297 | 8/1972 | Kuhn et al. | 210/502 |
| 3,712,072 | 3/1973 | Clapham | 55/387 |
| 3,715,869 | 2/1973 | Holden | 55/387 |
| 3,783,085 | 1/1974 | Pearson | 161/87 |
| 3,919,369 | 11/1975 | Holden | 264/45.1 |
| 4,013,566 | 3/1977 | Taylor | 96/153 X |
| 4,046,939 | 9/1977 | Hart | 428/311 |
| 4,061,807 | 12/1977 | Shaler et al. | 428/36 |
| 4,186,101 | 1/1980 | Reinhardt | 210/497 R |
| 4,664,683 | 5/1987 | Degen et al. | 55/387 |
| 4,665,050 | 5/1987 | Degen et al. | 502/402 |
| 4,800,190 | 1/1989 | Smolik | 502/416 |
| 4,906,263 | 3/1990 | von Blucher et al. | 55/361 |
| 4,981,501 | 1/1991 | von Blucher et al. | 55/316 |
| 4,992,084 | 2/1991 | von Blucher et al. | 55/316 |
| 5,033,465 | 7/1991 | Braun et al. | 128/205.27 |
| 5,078,132 | 1/1992 | Braun et al. | 128/206.12 |
| 5,129,929 | 7/1992 | Linnersten | 55/524 X |
| 5,256,476 | 10/1993 | Tanaka et al. | 55/524 X |

FOREIGN PATENT DOCUMENTS

| | | |
|---|---|---|
| 0399730 | 11/1990 | European Pat. Off. |
| 0491175 | 6/1992 | European Pat. Off. |
| 3817084 | 9/1989 | Fed. Rep. of Germany |
| 52-040868 | 3/1977 | Japan ............ 96/153 |
| 52-040869 | 3/1977 | Japan ............ 96/153 |
| 4-180808 | 11/1990 | Japan |
| 1390668 | 4/1975 | United Kingdom |
| 2254257 | 10/1992 | United Kingdom |

*Primary Examiner*—Robert Spitzer
*Attorney, Agent, or Firm*—Gary L. Griswold; Walter N. Kirn; William J. Bond

[57] ABSTRACT

A self-supporting filter of adsorbent particles is provided by agglomerating the adsorbent particles with a thermoplastic binder and forming a self-supporting filter with a low pressure drop and high efficiency suitable for use as an automotive cabin filter.

29 Claims, 2 Drawing Sheets

AGGLOMERATED ACTIVATED CARBON AIR FILTER

This application is a continuation-in-part of U.S. Ser. No. 07/921,234, filed Jul. 29, 1992, now abandoned.

FIELD OF THE INVENTION

The present invention relates to improved porous adsorbent self-supporting structures particularly suited for filtration of gases and vapors where very low pressure drop of fluid flow while maintaining high adsorption efficiency. The invention structures have a high dynamic adsorption capacity and high efficiency for contaminant removal with low pressure drop and uniform air flow characteristics.

BACKGROUND OF THE INVENTION

It is known in the art that activated carbon can remove undesired odors, noxious fumes, organic vapors and the like from air and fluid streams. It is also known to use these activated carbon granules in a variety of structures including packed beds, loaded nonwovens, loaded foams, and bonded adsorbents. Granular adsorbents have been bonded and molded into shapes suitable for filtration of gases.

For example, Breger et al. U.S. Pat. No. 3,217,715, and Tobias, U.S. Pat. No. 3,474,600, propose extruding cylindrical, or other shaped, pellets of activated carbon which pellets are then placed into a supporting structure. The rods exemplified were an extruded mix of activated carbon and polyethylene binder. The purpose of these patents was to provide improved pressure drops over carbon bonded into a monolithic structure (e.g., a sheet). U.K. Patent No. 1,390,668 stated that a drawback with this extrusion process was that during extrusion a substantial portion of the pores within the rods became clogged resulting in a decrease in adsorption capacity and an increase in pressure drop when the extruded rods were used alone (i.e., a cigarette filter), rather than a packed bed. This patent proposed forming sheets of bonded activated carbon using a polyolefin binder by mixing hot carbon with the binder, collecting the mixture on a belt, leveling the mixture, and compressing the mixture. The objective is to eliminate shear forces in forming the bonded carbon body.

U.S. Pat. No. 3,538,020, Hassett et al., proposes forming filters by coating adsorbent particles with a liquid prepolymer binder, placing the coated particles in a mold and curing. A cartridge formed by this method allegedly had three combined advantages not simultaneously possessed by any of the tested commercial cartridges, low cost, good efficiency and low pressure drop. A similar technique is discussed in U.S. Pat. Nos. 3,544,507 (Lloyd) and 3,721,072 (Clapham) who used a binder emulsion or solution of a vinylidine polymer and a water soluble thermosetting aminoplast to coat activated carbon. The object of the Lloyd patent was to prevent dusting and provide adequate binding of the activated carbon particles without a great loss in adsorption capacity. Clapham describes forming such coated carbon granules into a pleated structure to provide improved pressure drop performance.

U.S. Pat. No. 4,061,807 (Shaler et al.) describes a method where water is used to promote adhesion between a binder and a granular adsorbent material prior to molding the binder and adsorbent and heating to consolidate the material into a self-supporting filter. This allegedly provides a simple method to manufacture a self-supporting adsorbent filter.

Reduction in pressure drop is a concern with U.S. Pat. No. 4,981,501 (Von Blucher et al.). This patent proposes dipping a 3-dimensional open framework into a binder or adhesive, then dipping the binder-coated framework into a mass of loose absorbent granules (about 0.1-1 mm diameter).

U.S. Pat. No. 3,919,369 (Holden) molds a self-supporting filter using a method similar to that of Shaler et al. with holes formed into the molded shape to decrease pressure drop. These open structures, however, will be deficient in efficiency.

U.S. Pat. No. 5,033,465 (Braun) discloses forming a self-supporting panel-shaped filter. The binder used is predominately of a particle size greater than 400 mesh. The patent emphasizes uniform mixing of binder and adsorbent granules and avoiding agglomeration.

U.S. Pat. No. 4,665,050 (Degen et al.) describes a self-supporting structure comprising an inorganic sorbent such as alumina, and a binder. The process for immobilizing the sorbent particles in the self-supporting structure comprises the steps of: (a) preheating the inorganic sorbent particles to an elevated temperature sufficient to slightly soften the binder particles; (b) mixing the sorbent particles with a binding material to coat the sorbent particles while avoiding adhesion between binder particles (by use of cooling or of an antiagglomerating agent); and (c) heating the mixture to about the solid-liquid transition temperature of the polymeric binding material with or without pressure to form a structure which upon cooling is self-supporting.

The above patents propose a variety of methods for employing adsorbent particles in a variety of filter applications and providing varying levels of efficiency, capacity, pressure drop and cost. The present invention is directed at forming a self-supporting filter structure having good efficiencies and adsorption capacities while providing low pressure drops. Particularly, the invention is directed at providing an adsorbent self-supporting filter for use in applications such as a recirculating filter, room filter or automotive filter where low pressure drop and good adsorption efficiency is required.

DETAILED DESCRIPTION OF THE INVENTION

Figure 1:
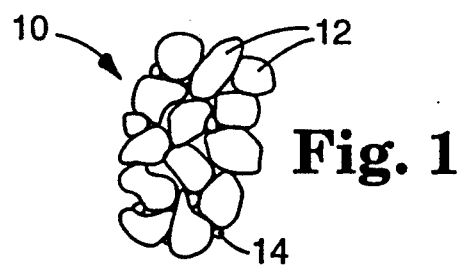
FIG. 1 is an illustrative and magnified fragmentary view of the bonded adsorbent granules in a single agglomerate.

Referring to the drawings, the agglomerated bonded adsorbent structures of the present invention are produced by first heating the adsorbent granules 12 to a temperature near the thermoplastic binder plastic flow or softening temperature followed by mixing and blending the adsorbent granules and binder particles 14 to yield agglomerates 10 having a fairly uniform size distribution. The resultant agglomerates 10 are subsequently sieved to provide a desired size range, and layered in a suitable mold for further bonding under heat into a unified structure 20.

Figure 2:
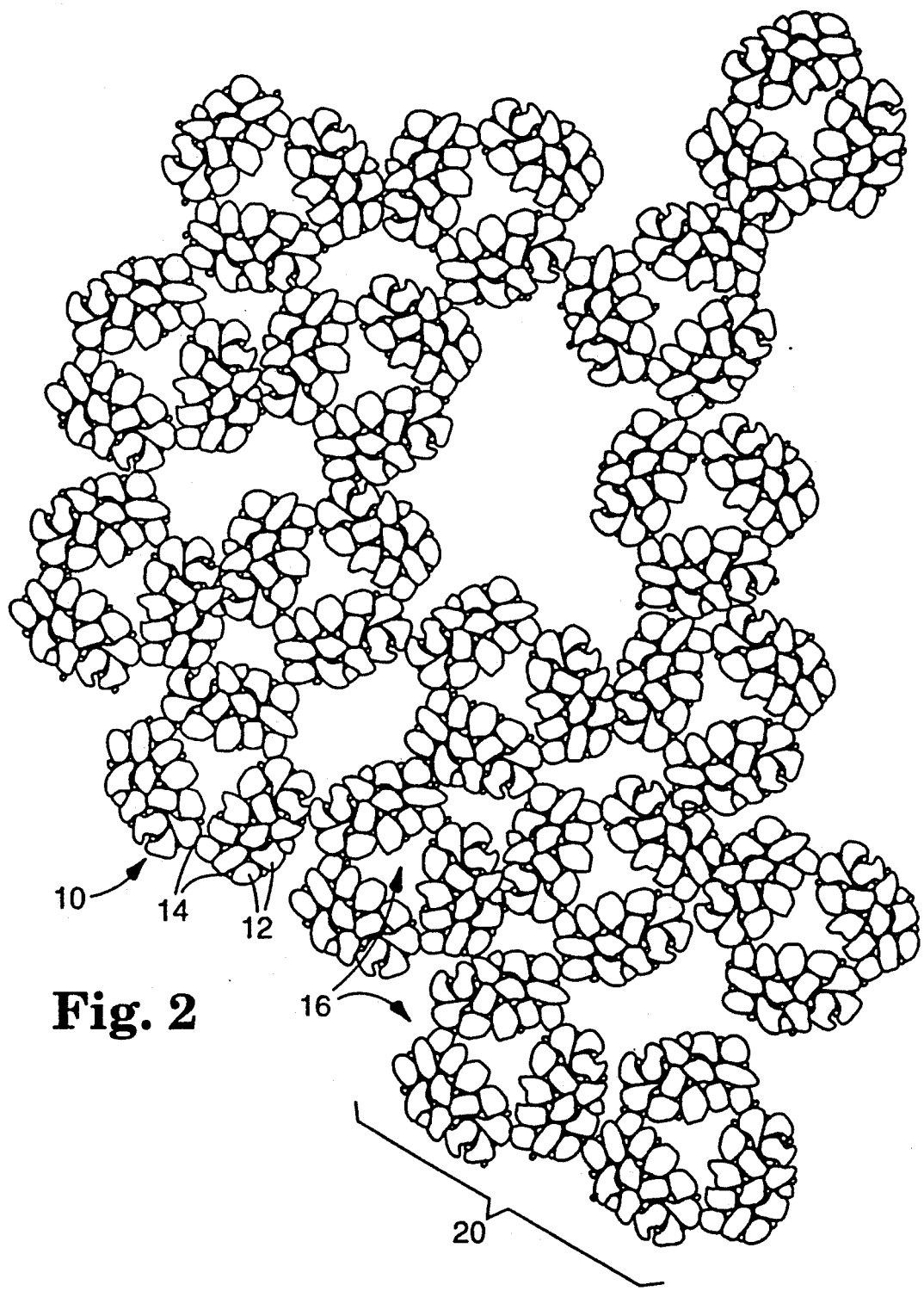
FIG. 2 is an illustrative and enlarged partial cross-sectional view of the bonded agglomerated adsorbent granules in the invention self-supporting filter.
Figure 3:
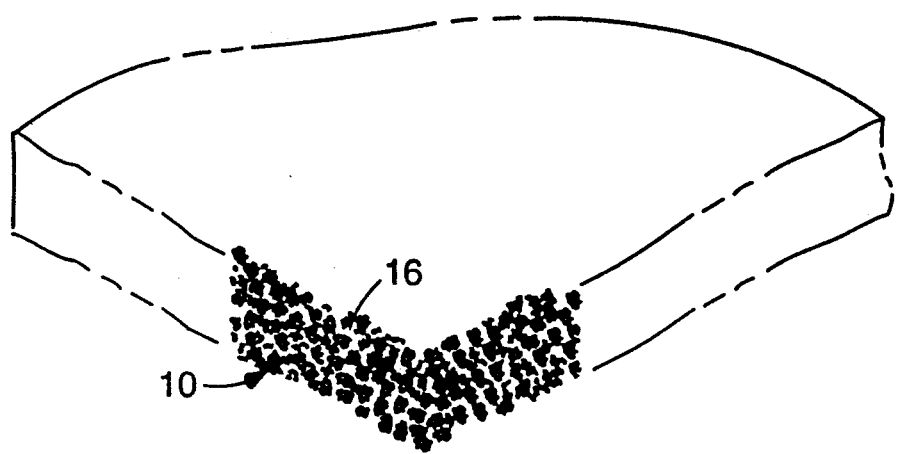
FIG. 3 is a cutaway perspective view of a corner of the invention self-supporting filter.

FIGS. 2 and 3 illustrate a portion of the unified structure 20 after the bonding process where binder particles 14 on the surface of granules 12 have joined adjacent agglomerates 10 of adsorbent granules 12 and binder particles 14. The agglomerates are spaced apart to form interstices 16 within the unified filter structure 20. The spacing and size of these interstices 16 are dependent upon the agglomerate 10 size, and the degree of compaction.

The adsorbent material used to form the agglomerates 10 is preferably an activated carbon granule, however, other adsorbent materials are also suitable for formation into self-supporting filters in accordance with the disclosed invention. These adsorbent particles are well known and described, for example, in U.S. Pat. No. 4,061,807. These adsorbent particle or granular materials can be as small as 300 mesh (mesh referred to herein is U.S. Standard Mesh) but will typically have a mesh size ranging from about 10 to about 100, and preferably from about 12 to 70. In forming the agglomerates 10, it is not necessary to have granular material 12 of uniform size, rather the granular adsorptive material 12 mesh size can range broadly. Generally, it has been found with filters using agglomerates of similar size ranges that the use of smaller size ranges of adsorptive material 12 provides filters of better removal efficiency, however, with slightly higher pressure drop compared to larger size ranges of adsorptive material 12.

The bonding material used to form the agglomerates 10 are generally a particulate thermoplastic polymer binder having a softening temperature below that of the granular adsorptive material. The particulate size of the binder material should be of a particle size less than that of the granular adsorptive material. Generally, the binder particle size will be about 20% less than the average granular absorptive particle size, and preferably about 90% less than the average granular particle size. However, it is generally preferred that the mean binder particle size be less than about 100 mesh, and preferably less than about 250 mesh. Again, it is possible to use binder particles of a wide range of particle sizes, provided that the average particle size is substantially less than that of the granular absorptive material. Suitable thermoplastic polymer binders can be formed from polymers such as polyolefins, polyacrylates, polyarenes, polyamides, or thermoplastic elastomers such as polyurethanes, polydiene polymers and block copolymers, or the like. Generally, the selection of the thermoplastic binder is limited by softening point temperature considerations and the ability to form the thermoplastic material into a fine binder particle. For example, higher softening point binders are preferred for higher service temperature applications and some elastomers are too tacky to form fine particles unless ground and stored under extreme temperature conditions.

The binder particles will typically constitute less than 40 weight percent of the filter material, preferably less than 25 weight percent, and most preferably less than about 15 weight percent of the filter.

The agglomerates 10 of the filter formed from the binder particles 14 and adsorbent particles 12 will have an average particle size generally less than about 15 mesh, preferably less than about 12 mesh, and most preferably from about 3 to 12 mesh. These agglomerates are formed from a plurality of adsorptive particles 12 and binder particles 14.

The agglomerates are then further consolidated into a unified filter structure provided with interconnected interstices 16 providing an open interconnecting matrix within the unified network of agglomerates 10. Generally, it has been found that the invention filter has a pore volume of about 70–85% and preferably from 75 to 85%. This open matrix is evidenced by the lower density of the invention agglomerate filters compared to comparable non-agglomerate filters. Generally, the density of the invention agglomerated filters will decrease by at least 3% and preferably up to about 20% or more compared to similarly prepared non-agglomerate filters of the same adsorbent and binder. The provision of this open interconnecting matrix has been found to substantially decrease the pressure drop across a filter formed in this manner, compared to filters formed from non-agglomerated adsorbent particles, with little or substantially no loss in removal efficiency. The invention filter has been found to be particularly useful where pressure drop is a major consideration, however, where superior removal efficiency is still required. Exemplary uses would be as a cabin filter in a vehicle or a room odor removal filter. These uses require the lower pressure drops critical to filtering relatively large amounts of air and good removal efficiency, but where removal efficiency is not necessarily as critical, such as for single pass facemask filter. Generally, the calculated pressure drop for a standard 0.35 inch thick filter of the invention is less than 15 mm $H_2O$ preferably less than 10 mm $H_2O$ and most preferably less than 5 mm $H_2O$ at a flowrate of 30 $m^3$/hr across a surface area of about 77 $cm^2$.

To obtain this open structure the formed agglomerates are placed in molds, preferably without any consolidating pressure. The molds and the contained agglomerates are then heated to a temperature above the softening temperature of the particulate binding material for a time sufficient to thoroughly heat the mold and its contents to a uniform temperature above the binder softening point. A particular preferred method for forming the agglomerates into a molded structure involves continuous or intermittent turning or rotation of the mold and its contents during the heating operation to prevent settling of the agglomerates. Filters formed in this manner have showed the greatest decrease in pressure drop compared to filters formed from non-agglomerated adsorbent particles.

The agglomerates themselves are preferably formed by pre-heating the granular adsorptive material to a temperature generally at least 5° C. and preferably at least 10° C. above the softening point temperature of the binder particles. The heated granules are then placed in a mixing device and the binder particles are added with no consolidation. Particles are then briefly agglomerated in the mixing device to provide agglomerates as previously described. This results in agglomerates of many different sizes, each having a random or irregular shape defined by the random bonding of heated granules and binder particles, as shown in FIGS. 1 and 2. The agglomerates are then separated into appropriate size fractions, if necessary, as described in the Examples.

The filters can be molded from the agglomerates into any suitable shape. For example, a panel structure or a pleated structure would generally be suited for many applications.

Figure 4:
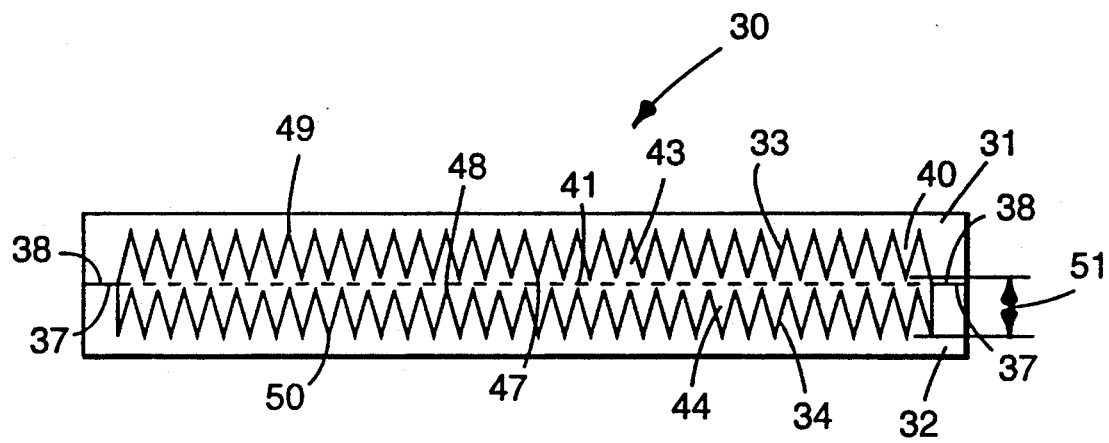
FIG. 4 is a cutaway side perspective view of a molded self-supporting filter and the associated mold.

FIG. 4 illustrates a preferred pleating design for the self-supporting filter of the invention. The filter (40) is formed in a mold (30) which would preferably be two mold halves (31 and 32). In each mold half (31 or 32) would be initially formed a separate half (43 or 44) of the molded filter (40).

Each mold half (31 and 32) would have a profiled face (33 and 34) and an open top to facilitate addition of the formed agglomerates. Use of a more restricted opening and one-step molding is less desirable in view of the difficulties in uniformly distributing the agglomerates and removing the resulting formed molded filter. The mold halves (31 and 32) would preferably have circumscribing lips (37 and 38) on at least two opposing edges to facilitate removal of excess agglomerates by a doctor blade or the like. The lip edges (37 and 38) are above the highest point(s) (47 or 48) of the profiled faces (33 or 34) of the mold halves (31 and 32). The highest point(s) (47 and 48) of the profiled faces (33 and 34) are preferably vertically offset from each other when the mold halves are jointed, as shown in FIG. 4, and/or set below the lip faces (37 and 38), typically by 1 cm or more. This prevents holes or weak lines in the filter by offsetting the valleys of the profiled faces of the molded filters. Each filter half is formed, as described above, then the two halves are joined at 41. The mold and/or filter halves are then heated or preheated sufficiently to cause the two halves to join. Generally, only one mold or filter half exposed face need be heated to a temperature sufficient to cause the thermoplastic resin on the exposed face of the filter half to soften.

The FIG. 4 molded filter arrangement is a particularly preferred pleated filter arrangement where the pleat is in a zig-zag form created by offsetting the peaks (48 and 47) of each zig-zag profiled mold face (33 and 34) so that they align with the opposing valleys (49 and 50) in the opposing mold half (31 and 32) profiled face. The peaks and valleys of the resulting profiled faces of the molded filter are opposite to each other. The resulting profiled molded filter has a constant thickness (51) into the filter face. The resulting molded filter also has substantially reduced pressure drop compared to an equal basis weight flat panel filter and improved removal efficiencies compared to flat panel filters of similar pressure drops.

In a preferred use, the molded filter is used to filter a vehicle passenger compartment such as in an automobile. In this preferred use, or like uses, the filter would have an associated means to draw or push air through the filter. This air moving means could be a conventional fan or conduction through the moving vehicle vents. The air moving means would be in fluid communication with the filter.

The following examples are illustrative of the presently contemplated preferred embodiments for practicing the invention and should not be considered as limiting thereof.

EXAMPLE 1

First agglomerates were prepared. 200 gms of treated activated carbon granules, 12×20 mesh (coconut derived activated GG carbon available from Kuraray, Okayama Japan), were heated at 185° C. for 45 minutes. The granules were treated with an aqueous solution of $K_2CO_3$ to improve absorption of acid gas. These heated granules were then dry mixed with 34 gm of polyurethane of particle size in the range 50 to 225 microns (Morton ™ PS 455-100, MORTON-THIOKOL, Seabrook, N.H., melting point range of 130°-155° C. for 24 seconds in a mechanical mixer with two counter-rotating blades, and having a curved bottom to ensure contact between the granules, the binder and the blades. The resultant carbon granule agglomerates, adhered with binder particles, were sieved through a series of sieves with successively smaller aperture (larger mesh) size to provide successively smaller agglomerate size cuts. The sieved agglomerates were then layered loosely in a 4"×5" mold (10.2 cm by 12.7 cm) and heated to 165° C. for 40 minutes without compression. The molded and bonded agglomerates were then cooled to room temperature. The formed adsorbent structure exhibited good inherent strength. Adsorbent filter structure was tested for pressure drop, at a flow rate of 30 m³/hr (the testing device having a LFE, Laminer Flow Element, median pressure drop of 33.5 Pa) through an approximately 77 cm² cross-section.

A 75 ppm challenge of toluene, flowing at 170 liters per minute, was passed through an 8.89 cm×5.08 cm surface of the bonded absorbent filter structures (from a pre-cut 10.2 cm×6.35 cm sample). The effluent toluene level was measured at designated times, and an efficiency of removal was calculated by the formula:

$$(1\text{-effluent ppm}/75\text{ ppm})\times 100\% = \text{efficiency}$$

The 75 ppm represents the upstream toluene concentration. The test was run at a relative humidity of 85% and 50% (at higher humidity levels the activated carbon filter service efficiency is more severely challenged than at a lower humidity level due to preferential adsorption of water vapor). Certain of the adsorbent filter structures were subsequently tested for removal efficiency with a 70 ppm challenge of n-butane and then a 20 ppm challenge of sulfur dioxide using the same surface area and filter. The efficiency test results for filters formed from the various agglomerate size cuts are set forth in Table 1. For comparison, a filter formed from non-agglomerated carbon granules and the binder was also tested (heated in the mold for 60 minutes).

The calculated (cal.) pressure drop was obtained by multiplying the actual tested pressure drop by 8.89 mm (standard thickness) and dividing by the real thickness.

TABLE 1

|  | Non-agglom. |  |  |  |  |
| --- | --- | --- | --- | --- | --- |
| Upper Mesh |  | 3 | 3 | 7 | 12 |
| Lower Mesh |  | 7 | 12 | 12 | + |
| Weight (gm) | 27.4 | 20.0 | 22.3 | 23.3 | 24.4 |
| Thickness (mm) | 6.10 | 6.86 | 6.60 | 6.35 | 5.58 |
| Density (gm/cm³) | 186.8 | 121.3 | 140.9 | 152.4 | 181.9 |
| (% of Non-agglom. density) |  | (65%) | (75%) | (82%) | (97%) |
| Cal. Pressure drop (Pascals) | 177.4 | 29.4 | 39.2 | 51.0 | 93.1 |
| 85% Rel. Humidity |  |  |  |  |  |
| Toluene |  |  |  |  |  |
| 1 min | 82% | 59% | 67% | 70% | 80% |
| 5 min | 78% | 57% | 64% | 67% | 77% |
| 50% Rel. Humidity |  |  |  |  |  |
| Toluene |  |  |  |  |  |
| 1 min |  | 57% | 63% | 71% | 72% |
| 5 min |  | 58% | 63% | 71% | 72% |
| n-butane |  |  |  |  |  |
| 1 min |  | 41% | 44% | 49% | 48% |
| 5 min |  | 26% | 29% | 34% | 29% |
| SO₂ |  |  |  |  |  |
| 1 min |  | 52% | 60% | 60% | 63% |
| 5 min |  | 39% | 44% | 44% | 48% |

Table 1 demonstrates that structures with no agglomeration have a significantly higher pressure drop and generally higher adsorption efficiency compared to the agglomerated particle filter at both 50% and 85% relative humidity. The agglomerate filter, where the agglomerate particle size was 12 mesh and smaller, provided a filter having an efficiency comparable to the non-agglomerated filter at about half the pressure drop. Agglomerated filters containing the 7×12 mesh size cut of agglomerates also performed with good efficiency and superior pressure drop.

EXAMPLE 2

Treated activated carbon granules (200 gms), 30×70 mesh (Kuraray, Okayama Japan) were heated at 185° C. for 35 minutes. These granules were then dry mixed with 34 gm of binder (Morton TM PS 455-100) for 30 seconds in the mechanical mixer. The resulting agglomerates of carbon granules and adhered binder particles were sieved into mesh size fractions as in Example 1 and outlined in Table 2. The sieved agglomerates were then loosely layered in an aluminum mold (10.2 cm×12.7 cm), and the contents brought to 166° C. for 40 minutes without compression. The mold and formed filter structure were then cooled to room temperature. The resulting filter structures were then tested for toluene removal efficiency at 85% relative humidity and toluene, n-butane and sulfur dioxide removal efficiency at 50% relative humidity, as in Example 1, the results of which are set forth in Table 2.

TABLE 2

|  | Non-agglom. |  |  |  |
| --- | --- | --- | --- | --- |
| Upper Mesh |  | 3 | 7 | 12 |
| Lower Mesh |  | 7 | 12 | + |
| Weight (gm) | 24.0 | 14.0 | 13.8 | 20.9 |
| Thickness (mm) | 5.8 | 5.3 | 5.6 | 5.3 |
| Density (gm/cm³) | 170.4 | 109.8 (64%) | 103.2 (63%) | 162.2 (95%) |
| Cal. Pressure drop (Pascals) | 188.2 | 41.2 | 47.0 | 142.1 |
| 85% Rel. Humidity |  |  |  |  |
| Toluene |  |  |  |  |
| 1 min | — | 69% | 84% | 96% |
| 5 min | — | 59% | 74% | 91% |
| 50% Rel. Humidity |  |  |  |  |
| Toluene |  |  |  |  |
| 1 min | 83% | 67% | 78% | 90% |
| 5 min | 83% | 66% | 78% | 90% |
| n-butane |  |  |  |  |
| 1 min | 78% | 50% | 56% | 76% |
| 5 min | 64% | 32% | 34% | 59% |
| SO₂ |  |  |  |  |
| 1 min | 72% | 56% | 61% | 90% |
| 5 min | 64% | 36% | 34% | 67% |

The smaller mesh size carbon granules of this example provided excellent removal efficiency with good pressure drop levels with the exception of the agglomerate mesh particle size cut of 12 mesh and smaller where efficiency was excellent however with a pressure drop almost as high as the non-agglomerated filter. The small carbon granules used to form the agglomerates for this example provided filters with improved efficiency using a lower mass of carbon at slightly higher pressure drops.

EXAMPLE 3

It was further discovered that during the molding process there was a tendency for a compression of the agglomerate structure under the agglomerate's own weight during the heat molding process thereby closing the interstices and hindering fluid flow. In order to reduce this compaction of the agglomerates, a two-stage molding process was invoked whereby the agglomerated carbon material in the mold was heated for 20 minutes at 166° C. followed by inverting the mold to its opposite side and heating the mold at 166° C. for an additional 20 minutes. For Table 3, molded filters were generated utilizing 200 gms of activated carbon granules from Kuraray (12×20 mesh) heated to 185° C. for 45 minutes. The binder (34 gms), Morton-PS TM 455-100, was mixed with the heated carbon for 15 seconds in the mechanical mixer. The resultant agglomerated carbon was sieved as outlined in Table 3 by the method of Example 1. The two-stage molding process described above was used to form these filters. The filters formed using this method generally provided filters having a lower density compared to those formed by the method of Examples 1 and 2. This allowed for thicker filters, with generally higher removal efficiencies, without significant increases in pressure drop. The removal efficiencies are summarized in Table 3 below.

TABLE 3

| Upper Mesh | 3 | 3 | 7 | 12 |
| --- | --- | --- | --- | --- |
| Lower Mesh | 7 | 12 | 12 | + |
| Weight (gm) | 32.4 | 36.1 | 37.3 | 43.6 |
| Thickness (mm) | 11.2 | 11.2 | 10.7 | 10.7 |
| Density (gm/cm³) | 121.3 | 134.4 | 145.8 | 170.4 |
| (% of non-agglom. density) | (65%) | (72%) | (78%) | (91%) |
| Cal. Pressure drop (Pascals) | 24.5 | 31.4 | 42.1 | 81.3 |
| 85% Rel. Humidity |  |  |  |  |
| Toluene |  |  |  |  |
| 1 min | 73% | 80% | 82% | 89% |
| 5 min | 70% | 77% | 80% | 86% |
| 50% Rel. Humidity |  |  |  |  |
| Toluene |  |  |  |  |
| 1 min | 66% | 77% | 80% | 88% |
| 5 min | 66% | 78% | 80% | 88% |
| n-butane |  |  |  |  |
| 1 min | 46% | 62% | 59% | 74% |
| 5 min | 34% | 45% | 45% | 58% |
| SO₂ |  |  |  |  |
| 1 min | 59% | 74% | 74% | 89% |
| 5 min | 49% | 63% | 62% | 81% |

The efficiency of the filters in this example are comparable to or better than the non-agglomerated filter of Example 1 with a calculated pressure drop generally less than the agglomerated filters of Example 1.

EXAMPLE 4

A further example was performed using the molding process of Example 3 and the activated carbon (30×70 mesh) of Example 2. The carbon used was heated to 185° C. for 40 minutes, then mixed with the Morton-PS TM 455-100 binder in the mechanical mixer for 30 seconds. The resultant agglomerated carbon was sieved as outlined in Table 4 and molded into a filter as described in Example 3 and efficiency tested.

TABLE 4

| Upper Mesh | 3 | 3 | 7 | 12 |
| --- | --- | --- | --- | --- |
| Lower Mesh | 7 | 12 | 12 | + |
| Weight (gm) | 17.5 | 18.4 | 20.1 | 29.1 |
| Thickness (mm) | 7.9 | 7.6 | 7.9 | 8.3 |
| Density (gm/cm³) | 91.8 | 99.9 | 106.5 | 144.2 |
| (% of non-agglom. density) | (54%) | (59%) | (63%) | (85%) |

TABLE 4-continued

| | | | | |
|---|---|---|---|---|
| Cal. Pressure drop (Pascals) | 35.3 | 46.1 | 53.9 | 149.0 |
| 85% Rel. Humidity | | | | |
| Toluene | | | | |
| 1 min | 73% | 82% | 93% | — |
| 5 min | 66% | 76% | 91% | — |
| 50% Rel. Humidity | | | | |
| Toluene | | | | |
| 1 min | 75% | 83% | 84% | 92% |
| 5 min | 75% | 83% | 84% | 92% |
| n-butane | | | | |
| 1 min | 54% | 64% | 68% | 82% |
| 5 min | 33% | 42% | 45% | 72% |
| $SO_2$ | | | | |
| 1 min | 56% | 63% | 68% | 86% |
| 5 min | 37% | 44% | 47% | 72% |

The removal efficiencies and pressure drops for this example were considerably improved compared to the filters of Example 2 using the same activated carbon and binder as in that example.

EXAMPLE 5

Comparative examples (vehicle filters, one for a Mercedes Benz S class automobile, one layer used of seven layer filter, and a Von Blücher VG 170 filter) of currently available vehicle filters are listed in Table 5.

TABLE 5

| | Mercedes Filter | VG 170 |
|---|---|---|
| Weight (gm) | | 9.8 |
| Thickness (mm) | 6.4 | 1.5 |
| Density (gm/cm$^3$) | 163.9 | 267.1 |
| Cal. Pressure drop (Pascals) | 42.5 | 315.3 |
| 85% Rel. Humidity | | |
| Toluene | | |
| 1 min | 78% | 50% |
| 5 min | 70% | 37% |
| 50% Rel. Humidity | | |
| Toluene | | |
| 1 min | 78% | 47% |
| 5 min | 78% | 47% |
| n-butane | | |
| 1 min | 64% | 27% |
| 5 min | 28% | 1% |
| $SO_2$ | | |
| 1 min | 22% | 4% |
| 5 min | 8% | 0% |

These commercial filters are formed from untreated activated carbon granules. The lack of treatment with $K_2CO_3$ prevents the decrease in efficiency associated with the $K_2CO_3$ coating blocking activated carbon surface area. However, the efficiencies obtained for the Mercedes filter are similar to the Example 2 (7×12 mesh cut) filter at an equivalent pressure drop and inferior to the filters of Examples 3 and 4 at similar mesh cuts. This filter appears to be a 3 dimensional mesh matrix coated with resin and then carbon particles which warrants an extremely complicated and costly fabrication technique. The VG 170 filter is carbon sandwiched between cloth fiber and had unacceptable pressure drop and removal efficiencies.

EXAMPLE 6

Two machined aluminum mold halves such as shown in FIG. 4 were each filled with 160 grams of carbon granules agglomerated prepared substantially according to the previous invention Examples using a Morton-PS ™ 455-100 binder and GC16×35 carbon (available from Kuraray, Okayama, Japan). The size of the agglomerates was 3–7 mesh (U.S. Standard Mesh).

One filled mold half (A) was placed into an oven with recirculating air at a temperature of 165° C. to 175° C. After 25 minutes, the second mold half (B) containing 160 grams of agglomerated carbon was placed into the oven. After 45 minutes, mold half (A) was removed and allowed to cool. After 70 minutes, mold half (B) was removed at which time mold half (A) was placed on top of (B). The two molds were flipped over so that mold half (B) was on top allowing gravity to drop the hot molded structure onto the cooler mold thus joining the two halves together. The mold was allowed to cool at least 25 minutes before opening. The molded extended surface area structure was removed, cut down to a cross-sectional face area of 6.5×9 inches (16.5×22.9 cm), weighed (157 grams) and glued into a frame. The peak height on each profiled face was about 0.7 inches (1.8 cm) with each peak width about 0.375 inches (9.5 cm), the peaks on each profiled face offset as shown in FIG. 4. The valleys or low points of each peak were vertically offset by 0.25 inches (0.64 cm).

The pressure drop of the molded filter was measured at volumetric flow rates of 50, 100, 150, 200, 250 and 300 cfm (1.4, 2.8, 4.2, 5.7, 7.1 and 8.5 m$^3$/min). The sample was later cut down to a face area of 2.5×4 inches (6.3×10.2 cm) and glued into a box-like frame for toluene and n-butane removal efficiency testing.

A comparison was made to a 'flat' or non-extended surface area carbon filter with the same amount of carbon. Thus, a face area of 6.5×9 inch (16.5×22.9 cm) aluminum pan mold was made to which 157 grams of GC16×35 (3–7 mesh) agglomerated carbon was added. The carbon was heated in a recirculating air oven at 165° C. to 175° C. for 15 minutes. The carbon filter cake was removed and glued into a frame for pressure drop testing. The thickness of this sample was approximately 0.66 to 0.70 inches (1.68×1.78 cm). The sample was later cut down to a face area of 2.5×4 inches (6.3×10.2 cm), and glued into a box-like frame for toluene and n-butane removal efficiency testing.

To compare the extended surface structure to a 'flat' carbon filter with the same pressure drop, a thin carbon cake was made using 64 grams of GC16×35 (3–7 mesh) agglomerated carbon in a 6.5×9 inch (16.5×22.9 cm) aluminum pan mold. The carbon was heated in a recirculating air oven at 165° C. to 175° C. for 10 minutes. The carbon filter cake was removed and glued into a frame for pressure drop testing. The thickness of this sample was approximately 0.28 to 0.33 inches (0.71×0.84 cm). The sample was later cut down to a face area of 2.5×4 inches (6.3×10.2 cm) and glued into a box-like frame for toluene and n-butane removal efficiency testing.

The data for pressure drop (in Pascals) is in Table 6, while the data for gas removal efficiency tests is in Table 7 (46% relative humidity).

TABLE 6

| Pressure Drop vs. Flow Rate | | | |
|---|---|---|---|
| Structure | Extended | Flat | Flat |
| Weight | 157 g | 157 g | 64 g |
| Thickness | 3.0–3.3 cm | 1.7–1.8 cm | 0.7–0.8 cm |
| Flow Rate (m$^3$/min) | Pressure Drop (Pascals) | | |
| 1.4 | 10.8 | 33.3 | 11.8 |

TABLE 6-continued

| Pressure Drop vs. Flow Rate | | | |
| --- | --- | --- | --- |
| 1.8 | 35.3 | 101.9 | 36.3 |
| 4.2 | 69.6 | 198 | 69.6 |
| 5.7 | 115 | 329 | 114 |
| 7.1 | 172 | 510 | 169 |
| 8.5 | 235 | 706 | 230 |

TABLE 7

| Gas Removal Efficiency | | | |
| --- | --- | --- | --- |
| Structure | Extended | Flat | Flat |
| Weight | 157 g | 157 g | 64 g |
| Thickness | 3.0–3.3 cm | 1.7–1.8 cm | 0.7–0.8 cm |
| Toluene | | | |
| 1 minute | 84% | 94% | 72% |
| 5 minute | 84% | 94% | 72% |
| 15 minute | 84% | 94% | 72% |
| n-Butane | | | |
| 1 minute | 78% | 87% | 68% |
| 5 minute | 69% | 86% | 52% |
| 15 minute | 43% | 58% | 16% |

We claim:

1. A porous gas filter for use as a vehicle compartment filter, or the like, said filter in the form of a unified molded body, said filter body comprising;

adsorbent particles and particulate thermoplastic binder particles fused into agglomerate particles having a range of particle sizes of random and irregular shapes, and an average particle size of about 15 mesh or larger, said binder particles having an average particles size less than said adsorbent particles;

said agglomerates fused into said molded filter body providing open interstices between said agglomerates.

2. The porous filter of claim 1 wherein said adsorbent particles have an average particle size of about 100 mesh or larger.

3. The porous filter of claim 2 wherein the binder particle average size is 20% or less than the adsorbent particle average size.

4. The porous filter of claim 3 wherein the adsorbent particles have an average particle size of 70 mesh or larger.

5. The porous filter of claim 4 wherein the molded body has two opposing faces, the pressure drop across a standard 8.89 mm thickness between said two faces being 49 Pascals or less at an air flow rate of 30 m$^3$/hr and a surface area of 77 cm$^2$.

6. The porous filter of claim 1 wherein the adsorbent particles comprise carbon granules.

7. The porous filter of claim 6 wherein said initial toluene removal efficiency is at least 75% that of a comparable porous filter formed without agglomeration of the adsorbent particles at a pressure drop of less than about 98 Pascals for an 8.89 mm thick filter at an air flow rate of 30 m$^3$/hr and a surface area of 77 cm$^2$.

8. The porous filter of claim 6 wherein said initial toluene removal efficiency is at least 90% that of a comparable porous filter formed without agglomeration of the adsorbent particles at a pressure drop of less than about 147 Pascals for an 8.9 mm thick filter at an air flow rate of 30 m$^3$/hr and a surface area of 77 cm$^2$.

9. The porous filter of claim 1 wherein said molded filter body has at least one profiled face.

10. The porous filter of claim 9 wherein the molded filter body has two opposing profiled faces.

11. The porous filter of claim 10 wherein the profiled faces are each a series of alternative peaks and valleys in the form of a zig-zag where the peak of one face is directly opposite the valley of the opposing profiled face.

12. A porous filter apparatus for use as a vehicle compartment filter, or the like, said filter in the form of a molded body, said vehicle filter apparatus comprising:

an air moving means in fluid communication with said molded filter body;

a filter housing for said molded filter body, said molded filter comprising adsorbent particles and particulate thermoplastic binder particles fused into agglomerate particles having a range of particle sizes of random and irregular shapes, and an average particle size of about 15 mesh or larger, said binder particles having an average particles size less than said adsorbent particles;

said agglomerates fused into said molded filter body providing open interstices between said agglomerates.

13. The porous filter apparatus of claim 12 wherein said adsorbent particles have an average particle size of about 100 mesh or larger.

14. The porous filter apparatus of claim 13 wherein the binder particle average size is 20% or less than the adsorbent particle average size.

15. The porous filter apparatus of claim 14 wherein the adsorbent particles have an average particle size of 70 mesh or larger.

16. The porous filter apparatus of claim 12 wherein the molded body has two opposing faces, the pressure drop across a standard 8.9 mm thickness between said two faces being 49.0 Pascals or less at an air flow rate of 30 m$^3$/hr and a surface area of 77 cm$^2$.

17. The porous filter apparatus of claim 12 wherein the adsorbent particles comprise carbon granules.

18. The porous filter of claim 17 wherein said initial toluene removal efficiency is at least 75% that of a comparable porous filter formed without agglomeration of the adsorbent particles at a pressure drop of less than about 98 Pascals for an 8.9 mm thick filter at an air flow rate of 30 m$^3$/hr and a surface area of 77 cm$^2$.

19. The porous filter apparatus of claim 17 wherein said initial toluene removal efficiency is at least 90% that of a comparable porous filter formed without agglomeration of the adsorbent particles at a pressure drop of less than about 147 Pascals for an 8.9 mm thick filter at an air flow rate of 30 m$^3$/hr and a surface area of 77 cm$^2$.

20. The porous filter of claim 12 wherein the profiled faces are each a series of alternative peaks and valleys in the form of a zig-zag where the peak of one face is directly opposite the valley of the opposing profiled face.

21. The porous filter of claim 20 wherein the profiled faces are each a series of alternative peaks and valleys in the form of a zig-zag where the peak of one face is directly opposite the valley of the opposing profiled face.

22. The porous filter of claim 21 wherein the profiled faces are each a series of alternative peaks and valleys in the form of a zig-zag where the peak of one face is directly opposite the valley of the opposing profiled face.

23. A method for forming a porous filter comprising;

heating adsorbent particles to a temperature above the softening point of a thermoplastic binder particle, mixing said heated adsorbent particles with said thermoplastic binder particles wherein said thermoplastic binder particles have an average size at least 20% less than the adsorbent particle average size, agglomerating said adsorbent particles and binder particles into agglomerates having an average size of about 15 mesh or larger, forming said agglomerates into a predetermined shape, and heating said agglomerates to a uniform temperature above the softening point of said thermoplastic binder to form a fused filter body.

24. The method of claim 23 wherein the adsorbent particles are heated to a temperature at least 5° C. above the binder particle softening point.

25. The method of claim 24 wherein said adsorbent particles have an average particle size of about 100 mesh or larger and the adsorbent particles comprise carbon granules.

26. The method of claim 23 wherein the adsorbent particles are heated to a temperature at least 10° C. above the binder particle softening point.

27. The method of claim 23 wherein the agglomerates are formed into said predetermined shape by placing them in a mold with substantially no compression.

28. The method of claim 27 wherein the mold is turned over at least once during the heating process to form the fused body.

29. The method of claim 27 wherein the agglomerates are shaped in two mold halves each having an open top and a profiled face wherein the two molds are joined to provide a fused unitary filter body having two profiled faces.

* * * * *